(12) United States Patent
Oh et al.

(10) Patent No.: US 9,692,796 B2
(45) Date of Patent: Jun. 27, 2017

(54) APPARATUS AND METHOD FOR SETTING DISPOSITION WITH RESPECT TO DOCUMENT SHARE

(75) Inventors: Gyu-Bong Oh, Gyeonggi-do (KR); Sun-Gi Gu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 931 days.

(21) Appl. No.: 13/980,135

(22) PCT Filed: Feb. 8, 2012

(86) PCT No.: PCT/KR2012/000905
§ 371 (c)(1),
(2), (4) Date: Jul. 17, 2013

(87) PCT Pub. No.: WO2012/108678
PCT Pub. Date: Aug. 16, 2012

(65) Prior Publication Data
US 2013/0290432 A1    Oct. 31, 2013

(30) Foreign Application Priority Data
Feb. 8, 2011    (KR) ........................ 10-2011-0011129

(51) Int. Cl.
*H04L 29/06* (2006.01)
*G06Q 10/10* (2012.01)
*H04L 29/12* (2006.01)

(52) U.S. Cl.
CPC ........... *H04L 65/403* (2013.01); *G06Q 10/10* (2013.01); *H04L 61/1594* (2013.01)

(58) Field of Classification Search
None
See application file for complete search history.

(56) References Cited

U.S. PATENT DOCUMENTS

| 2004/0216039 | A1  | 10/2004 | Lane et al. |
| 2008/0104124 | A1* | 5/2008  | Bao ......................... G06F 21/10 |
| 2010/0325208 | A1* | 12/2010 | Chitturi ............... H04L 67/2804 709/204 |

FOREIGN PATENT DOCUMENTS

| EP | 1862932    | 12/2007 |
| JP | 2001265916 | 9/2001  |

(Continued)

OTHER PUBLICATIONS

PCT/ISA/237 Written Opinion issued on PCT/KR2012/000905 (pp. 5).

(Continued)

*Primary Examiner* — Kevin Bates
*Assistant Examiner* — Lesa Kennedy
(74) *Attorney, Agent, or Firm* — The Farrell Law Firm, P.C.

(57) ABSTRACT

Provided is an apparatus and method for setting disposition with respect to document information share. To this end, once a transmission-side server forwards a document forward request message including a document disposition rule with respect to a document to a reception-side server, the reception-side server checks a preference with respect to the document forward request message by using a preset user preference to notify a document change, and stores document data together with a disposition rule regarding the document data, such that efficient management and disclosure of private information forwarded to a user become possible and thus a CAB service can be easily and rapidly provided according to user's selection.

13 Claims, 3 Drawing Sheets

(56) References Cited

FOREIGN PATENT DOCUMENTS

JP 2008071315 3/2008
KR 1020080100356 11/2008

OTHER PUBLICATIONS

PCT/ISA/210 Search Report issued on PCT/KR2012/000905 (pp. 3).
Korean Office Action dated Mar. 28, 2017 issued in counterpart application No. 10-2011-0011129, 10 pages.

\* cited by examiner

Fig. 1
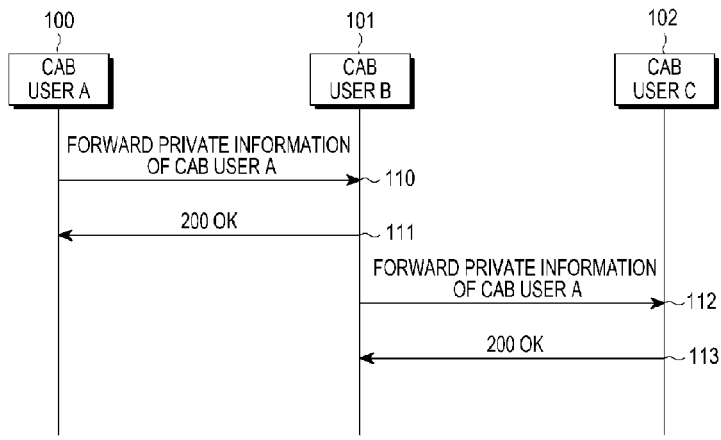
[Fig. 2]
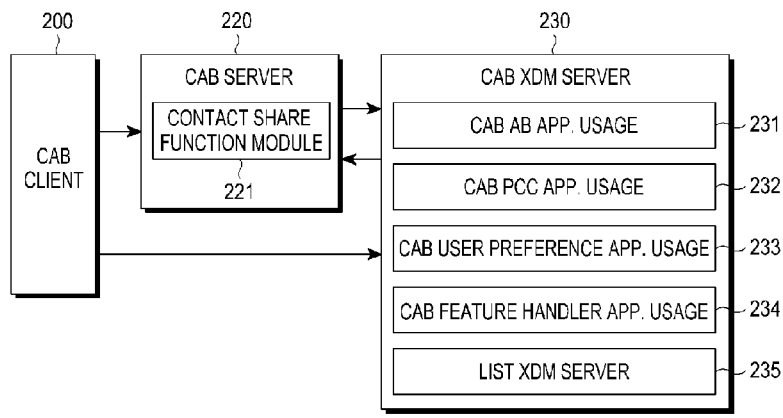

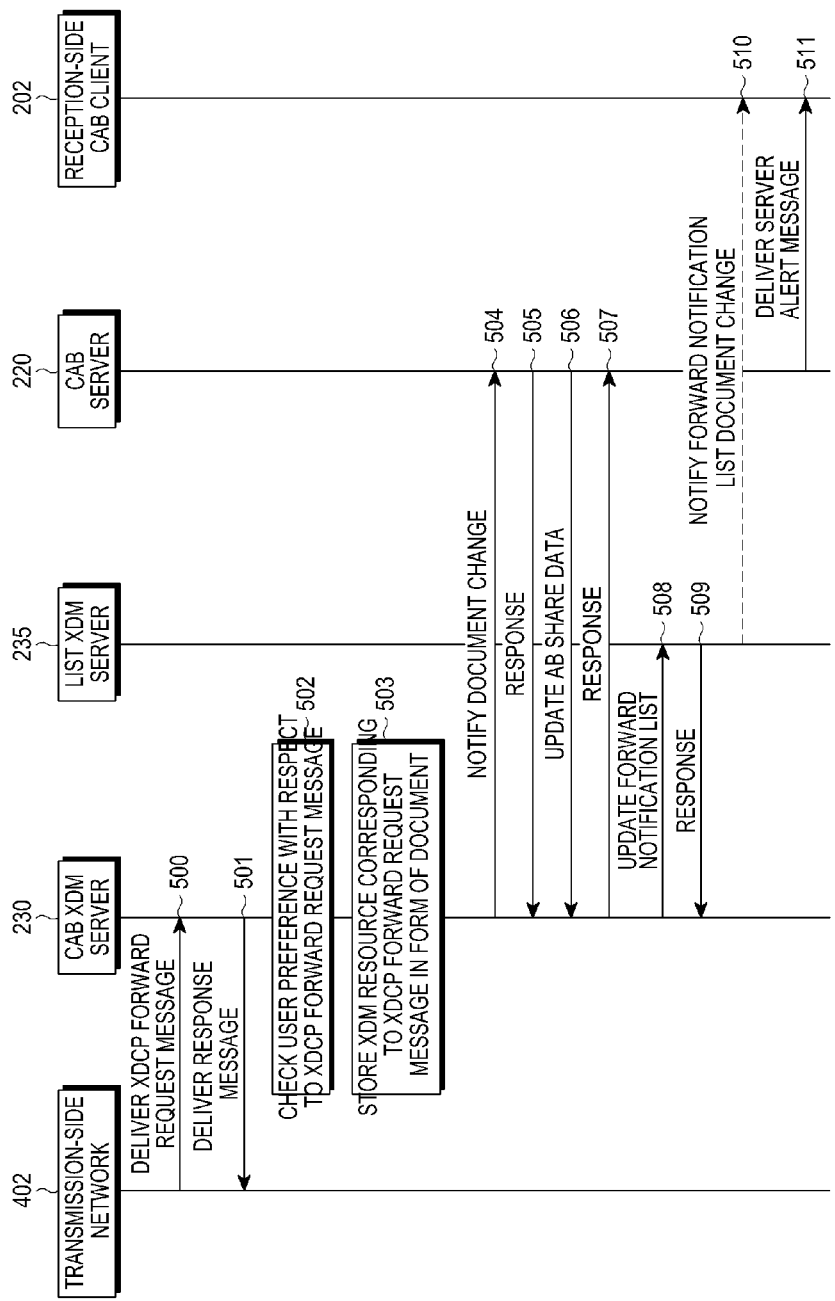

APPARATUS AND METHOD FOR SETTING DISPOSITION WITH RESPECT TO DOCUMENT SHARE

PRIORITY

The present application claims priority under 35 U.S.C. §365 to International Patent Application No. PCT/KR2012/000905 filed Feb. 8, 2012, and under 35 U.S.C. §119(a) to Korean Patent Application No. 10-2011-0011129 filed Feb. 8, 2011, which are incorporated herein by reference.

TECHNICAL FIELD

The present invention generally relates to an apparatus and method for setting document disposition, and more particularly, to an apparatus and method for setting document disposition in forwarding an Extensible Markup Language (XML) document.

BACKGROUND ART

A general Converged Address Book (CAB) service is provided to improve user experience and activity in association with an address book by storing a single network address book in a network.

The CAB conceptually consists of a CAB client, a CAB server, and a CAB XML Document Management Server (XDMS). The CAB XDMS includes a CAB Address Book (AB) application (app.) usage, a CAB personal contact card app. usage, a CAB user preference app. usage, and a CAB feature handler app. usage.

The CAB client communicates with the CAB server on a terminal, performs CAB user authentication and synchronization between contact information (i.e., a Personal Contact Card (PCC)) and an aggregated address book stored in a network repository, and sends CAB user's demands, such as address subscription, address search, address share, interaction with an existing address book, management of user preferences, or the like to the CAB server.

The CAB server, a main network component in a CAB structure, receives the CAB user's demands from the CAB client, and processes the received CAB user's demands. Main features of the CAB server include CAB client mutual authentication, CAB address storage, address information synchronization, and reflection of address in-formation updates from an address subscription feature into an address book. The CAB server is a network component which performs address subscription/share/translation and reflects user preferences/policies. The CAB server has an address subscription feature of retrieving a CAB user preference XML document from a CAB user preference repository and receiving a CAB user's subscription request, an address share feature of applying personal preferences to data received through address subscription and reflecting the data into an address book, maintaining subscription state information, and sharing the PCC or the aggregated address book, and an interworking feature of interworking with an existing address book system or exposing an interface to an external enabler.

An XDM server which manages user's data in association with the CAB enabler includes an AB app. usage, a CAB user preference app. usage for managing user preferences, a CAB feature handler app. usage for managing CAB service request/response, and a PCC app. usage for storing PCC information.

In addition, an XDMC for connecting to various app. usage functions, a SIP/IP core network for message routing with entities of an external domain, a PUSH enabler for delivering notification messages of non-SIP terminals, and so forth may be provided.

The CAB service may include the following main features:

1. Address Book Synchronization

A. Once a CAB user modifies a local address book in a terminal, a CAB client sends modified information to a CAB server by using a CAB-1 (SyncML) interface.

B. An Address Book (AB) synchronization function module in the CAB server reflects modified data in an AB app. usage in an XML Document Management (XDM) server by using an XDM agent. If the CAB client and the AB app. usage have different formats, conversion occurs, resulting in a data loss due to conversion between the different formats.

2. Contact Subscription

A. The CAB client sends an XML Configuration Access Protocol (XCAP) request for contact subscription to a CAB user preference app. usage.

B. The CAB user preference app. usage adds a reception contact address from the XCAP request to a contact subscription list.

C. The CAB user preference app. usage informs a contact subscription function in the CAB server of a document change of the contact subscription list.

D. The contact subscription function sends a contact subscription request associated with a reception side's PCC from the contact subscription list to a reception side's domain directly or via a subscription proxy.

E. A reception side's PCC app. usage having received the contact subscription request checks an access permission and a user preference and informs the reception side of a subscription result.

F. The CAB client may execute address subscription according to an XDM Document Command Protocol (XDCP) by using a subscribe and push enabler in an environment where SIP is not supported.

3. Contact Share

A. The CAB client sends an XML Configuration Access Protocol (XCAP) request for contact share to a CAB feature handler app. usage.

B. The CAB feature handler app. usage adds a reception contact address and a preference of share data from the XCAP request to a CAB feature handler.

C. The CAB feature handler app. usage informs a contact share function in the CAB server of a document change of the CAB feature handler.

D. The contact share function recognizes a contact status from the AB app. usage based on a reception side's address.

i. If the reception side is a CAB user, the contact share function creates the contact share request and then sends the created contact share request to the AB app. usage or the PCC app. usage in the XDM server by using the XDM agent. The corresponding app. usage sends the share data to the reception side based on an XDM forward mechanism.

ii. If the reception side is not a CAB user, the contact share function receives data from the AB app. usage or PCC app. usage in the XDM server for forwarding, requests the CAB interworking function to perform format conversion into a legacy format, and then sends the data to the reception side through a messaging enabler.

4. Contact Search

A. The CAB client sends a contact search request associated with its AB or PCC an AB or PCC of a different domain through an aggregation proxy/search proxy of an XDM enabler.

B. The contact search request is routed to the corresponding app. usage by the search proxy, and the corresponding app. usage sends back a search result to the CAB client.

C. The CAB client translates the contact search request into an external search request through the interworking function during an external directory search, translates an external search result received through the interworking function into a standard XML search result, and then sends the standard XML search result to the CAB client.

5. Retrieval of External Address Book from Non-CAB System

A. The CAB client sends an XML Configuration Access Protocol (XCAP) request for importing non-CAB data to the CAB feature handler app. usage.

B. The CAB feature handler app. usage adds a non-CAB source, a credential, and a scheduled interval from the XCAP request to the CAB feature handler.

C. The CAB feature handler app. usage informs the interworking function in the CAB server of a document change of the CAB feature handler.

D. The interworking function obtains information about non-CAB address book data to store the obtained information in an AB application storing unit according to the CAB user preference, and informs the CAB client to start address book synchronization.

FIG. 1 is a flowchart illustrating a process of forwarding an address in a conventional CAB system.

In the CAB system, in address forwarding, a CAB user A 100 forwards its PCC to a CAB user B 101 in step 110, and the CAB user B 101 then forwards an 200 OK response message to the CAB user A 100 in step 111. The CAB user B 101 forwards information of the CAB user A 100 stored in its AB XDMS to a CAB user C 102 in step 112, and the CAB user C 102 then forwards a 200 OK response message to the CAB user B 101 in step 113.

As such, conventionally, when the CAB user B forwards the information of the CAB user A to the CAB user C, private information of the CAB user A may be exposed due to unwanted forwarding.

DISCLOSURE OF INVENTION

Technical Problem

Although the forwarding of the private information of the CAB user A by the CAB user B may be thought to be implicitly agreed because the CAB user A, when forwarding its private information to the CAB user B, regards the CAB user B as a reliable partner, the private information of the CAB user A may be abused as a result of the forwarding.

Solution to Problem

Accordingly, the present invention provides an apparatus and method for allowing a user to efficiently manage and disclose private information by creating a disposition rule for preventing the illegal use of information forwarded during XML document forwarding and by forwarding the created disposition rule together with the XML document, in a CAB system.

According to an aspect of the present invention, there is provided a method for setting disposition with respect to document information share, the method including selecting disposition rule information with respect to a share document at the request of a user, creating a document share request message for sharing the share document comprising the selected disposition rule information, and forwarding the created document share request message to a transmission-side server.

According to another aspect of the present invention, there is provided a method for setting disposition with respect to document information share, the method including upon receiving a document share request message comprising disposition rule in-formation with respect to a share document from a transmission-side client, delivering a response message with respect to the document share request message to the transmission-side client, updating a disposition rule with respect to a previously stored share document through the received disposition rule information, and creating a document forward request message for forwarding the share document and forwarding the created document forward request message to a reception-side client.

According to another aspect of the present invention, there is provided an apparatus for setting disposition with respect to document information share, the apparatus including a means for selecting disposition rule information with respect to a share document at the request of a user, a means for creating a document share request message for sharing the share document comprising the selected disposition rule information, and a means forwarding the created document share request message to a transmission-side server.

According to another aspect of the present invention, there is provided an apparatus for setting disposition with respect to document information share, the apparatus including a means for, upon receiving a document share request message comprising disposition rule information with respect to a share document from a transmission-side client, delivering a response message with respect to the document share request message to the transmission-side client, a means for updating a disposition rule with respect to a previously stored share document through the received disposition rule information, and a means for creating a document forward request message for forwarding the share document and forwarding the created document forward request message to a reception-side client.

Advantageous Effects of Invention

The present invention can provide a communication service at high speed without wasting a resource, power, and a memory in a communication supporting various types of communication services.

BRIEF DESCRIPTION OF DRAWINGS

FIG. 1 is a flowchart illustrating a process of forwarding an address in a conventional CAB system;

FIG. 2 is a block diagram of a CAB system according to an embodiment of the present invention;

FIG. 4 is a flowchart illustrating a process of delivering, at a reception-side CAB system, an XML document request message including disposition rule information received from a transmission-side network to a reception-side CAB client, according to an embodiment of the present invention.

BEST MODE FOR CARRYING OUT THE INVENTION

Figure 3:
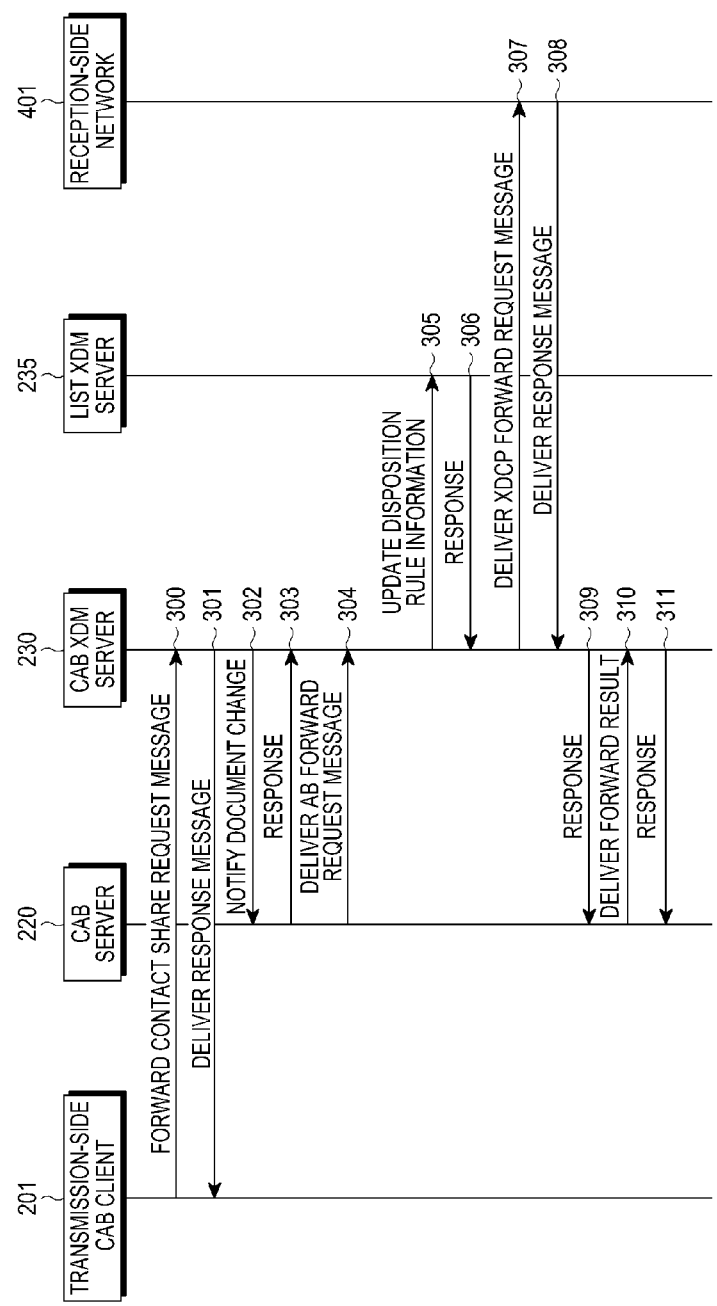
FIG. 3 is a flowchart illustrating a process of forwarding, at a transmission-side CAB system, an XML document request message including disposition rule information to a reception-side network, according to an embodiment of the present invention.

Hereinafter, an exemplary embodiment of the present invention will be described in detail with reference to the accompanying drawings. In the following description, a detailed description of known functions or configurations incorporated herein will be omitted when it may unnecessarily obscure the subject matter of the present invention.

In the present invention, a CAB user having a document to be shared (or share document) designates the entire document stored in a server or a portion of the document according to an input and selects a receiver's document disposition rule with respect to the designated entire document or the designed portion of the document, and a reception-side Address Book (AB) app. usage, upon receiving the document disposition rule, stores the received document disposition rule as a final contact (or address) state, such that efficient management and disclosure of private information to be forwarded to the user are possible. Herein, the disposition rule which can be set by a transmission side is as follows:

Allow-retrieve: Retrieve Allowed, Modify Disallowed

Allow-forward: Forward Allowed, Retrieve Allowed, Modify Disallowed

Allow-modify: Modify Allowed, Retrieve Allowed, Forward Disallowed

Allow-modify-right; Right Modify Allowed (Retrieve/Modify/Forward)

While a disposition rule setting process of a CAB service address sharing method is described in the present invention, the present invention is also applicable in the similar manner to general XML document transmission.

That is, a disposition rule created by an XDM client is delivered through an XML document forward message, and an XDM server having received the disposition rule stores the disposition rule in a disposition notification list in a forward notification list for a disposition rule in a LIST XDM server, and then creates and delivers an XDCP forward request message to a reception-side client. Thereafter, a reception-side XDM server stores the XDCP forward request message according to a user preference of a reception-side user, such that a reception side can easily manage an XML document to which a disposition rule is applied by a transmission side. Moreover, the disposition rule may be included in a request notification list of the LIST XDM server for notifying a reception-side terminal of the received XDCP forward request message, and stored and notified to the reception-side terminal, such that the reception side can know a detailed disposition rule applied to a document.

In addition, when a disposition rule for the share document is set, share may be set only for a share field among configuring fields. For example, to share an address book, the disposition rule may be set, such that all rights with respect to the address book are allowed only to a particular reception side and only a "read" right with respect to the address book is automatically provided to another particular reception side.

FIG. 2 is a block diagram of a CAB system according to an embodiment of the present invention.

Referring to FIG. 2, the CAB system may include a CAB client 200, a CAB server 220, and a CAB XDM server 230.

In an embodiment of the present invention, sharing of an address book (AB) will be described as an example.

In a transmission side, the CAB client 200 delivers an AB share request message including user's AB information and disposition rule data to the CAB XDM server 230 at the request of the user.

In a reception side, the CAB client 200 receives a server notification message created for AB synchronization from the CAB server 220 which has received the AB forward request message delivered from a transmission-side network.

The CAB server 220 includes a contact share function module 221, and in the transmission-side, receives a notification regarding an information change from a CAB feature handler app. usage 234 in the CAB XDM server 230, and delivers a response message with respect to the notification to the CAB XDM server 230.

The contact share function module 221 of the CAB server 220 creates an AB forward request message for AB information sharing, which includes the disposition rule data, and delivers the AB forward request message to the CAB XDM server 230.

The CAB server 220, upon receiving a response message with respect to the AB forward request message, delivers a forward result to the CAB XDM server 230, and receives a response message from the CAB XDM server 230.

In the reception side, the CAB server 220 is notified of a document change from the CAB XDM server 230, and delivers a response message thereto to the CAB XDM server 230.

The CAB server 220 converts AB information into a format used in a CAB AB app. usage 231 of the CAB XDM server 230, and adds the converted AB information to a document in the CAB AB app. usage 231 and also adds address state information regarding the converted AB information. The address state information may include an address type, an update form or a temporary addition form as an entry state, application or non-application of a disposition rule, and so forth.

The CAB XDM server 230 may include the CAB AB app. usage 231, a CAB PCC app. usage 232, a CAB user preference app. usage 233, the CAB feature handler app. usage 234, and the LIST XDM server 235. The LIST XDM server 235 may be implemented by being included in the CAB XDN server 230 or may be implemented separately outside the CAB XDM server 230.

In the transmission side, the CAB feature handler app. usage 234 in the CAB XDM server 230 receives an AB share request message from a transmission-side CAB client, and delivers a response message with respect to the received AB share request message to the CAB XDM server 230.

The CAB feature handler app. usage 234 notifies the CAB server 220 of a change of its document, and receives a response message from the CAB server 220.

The CAB PCC app. usage 232 in the CAB XDM server 230, upon receiving the AB share request message from the CAB server 220, updates disposition rule information included in the AB share request message in the forward notification list in the LIST XDM server 235.

The CAB PCC app. usage 232, upon receiving a response message from the LIST XDM server 235, stores AB information to be shared in a temporary storage space, and delivers the AB forward request message to the reception-side network.

The CAB PCC app. usage 232, upon receiving a response message from the reception-side network, creates a response message with respect to the AB forward request message and delivers the response message to the CAB XDM server 230.

A forward result is stored in the CAB feature handler app. usage 234 by means of the contact share function module 221 of the CAB server 220, and the CAB feature handler app. usage 234 delivers a response message to the contact share function module 221.

In the reception side, the CAB PCC app. usage 232 in the CAB XDM server 230, upon receiving an AB forward request message from a transmission-side network, checks if reception-side information in the AB forward request message exists in a corresponding domain, and delivers a response message with respect to the AB forward request message to the transmission-side network.

The CAB PCC app. usage 232 checks a preference of a reception-side CAB client with respect to an XDM forward request message from an AB forward preference in the CAB AB app. usage 231.

Thereafter, the CAB PCC app. usage 232 retrieves an XML resource from a transmission-side CAB PCC app. usage by using identification information included in the AB forward request message, stores the XDM resource in the form of a document, and notifies the CAB server 220 of a document change.

The CAB PCC app. usage 232, upon receiving a response message from the CAB server 220, updates address data in the CAB server 220, and receives a response message from the CAB server 220.

The CAB PCC app. usage 232 updates a forward notification list in the LIST XDM server 235 to notify a reception side of details of the AB forward request message, and receives a response message from the LIST XDM server 235.

The LIST XDM server 235 may be positioned outside the CAB XDM server 230, and in the transmission side, the disposition rule information is updated by the CAB XDM server 230 and a response message thereto is delivered to the CAB XDM server 230.

In the reception side, the LIST XDM server 235 updates details of an AB forward request message in the forward notification list by means of the CAB XDM server 230 and delivers a response message thereto to the CAB XDM server 230.

As such, the present invention creates and applies a disposition rule for the entire information or a portion thereof forwarded during XML document forwarding, allowing efficient management and forwarding of private information forwarded to the user and thus easily and quickly providing a CAB service to the user according to user's selection.

FIG. 3 is a flowchart illustrating a process of forwarding, at a transmission-side CAB system, an XML document request message including disposition rule information to a reception-side network, according to an embodiment of the present invention.

In step 300, a transmission-side CAB client 201 delivers an AB share request message including user's AB information and disposition rule data to the CAB feature handler app. usage 234 in the CAB XDM server 230 at the request of the user. Herein, the AB share request message is created by using an XML Configuration Access Protocol (XCAP).

The transmission-side CAB client 201 may include Allow-retrieve (Retrieve Allowed, Modify Disallowed) and Allow-forward (Forward Allowed, Retrieve Allowed, Modify Disallowed) as disposition rules for PCC information of a transmission-side user.

In this case, the AB share request message may be expressed as given below.

TABLE 1

```
<cab-feature id="abab1212">
<contact-share>
    <recipients-list>
        <list>
            <entry uri=sip:bob@example.com/>
        </list>
    </recipients-list>
        <note>This is my PCC</note>
        <display-name>happy joe</display-name>
        <data>
            <PCC>./cab-address-book/sip:joeblogs@example.com/
            cab-pcc/pcc</PCC>
        </data>
<disposition-rules>
<cp:ruleset>
  <cp:rule cp:id="dr-retrieve">
    <cp:conditions>
      <cp:identity>
        <cp:one id="sip:bob@example.com"/>
      </cp:identity>
    </cp:conditions>
  <cp:actions>
    <allow-retrieve/>
  </cp:actions>
        <cp:transformations>
    <fi:filter-set>
      <fi:ns-bindings>
        <fi:ns-binding prefix="pcc" urn="urn:oma:xml:cab:pcc"/>
      </fi:ns-bindings>
      <fi:filter id="dr-include">
        <fi:what>
          <fi:include type="xpath">//pcc:pcc/pcc:personal-details/
          pcc:name</fi:include>
          <fi:include type="xpath">//pcc:pcc/pcc:personal-details/
          pcc:comm-addr</fi:include>
          <fi:include type="xpath">//pcc:pcc/pcc:personal-details/
          pcc:career-history</fi:include>
        </fi:what>
      </fi:filter>
    </fi:filter-set>
  </cp:transformations>
<cp:rule cp:id="dr-forward">
<cp:conditions>
  <cp:identity>
      <cp:one id="sip:bob@example.com"/>
    </cp:identity>
   </cp:conditions>
  <cp:actions>
    <allow-forward/>
  </cp:actions>
        <cp:transformations>
    <fi:filter-set>
      <fi:ns-bindings>
        <fi:ns-binding prefix="pcc" urn="urn:oma:xml:cab:cab-pcc"/>
      </fi:ns-bindings>
      <fi:filter id="dr-include">
        <fi:what>
          <fi:include type="xpath">//pcc:cab-pcc/pcc:name</fi:include>
<fi:include type="xpath">//pcc:pcc/pcc:personal-details/pcc:comm-
addr</fi:include>
      </fi:filter>
    </fi:filter-set>
  </cp:transformations>
</cp:ruleset>
</disposition-rules>
</contact-share>
</cab-feature>
```

As expressed in Table 1, the disposition rules may be divided into disposition rules for the entire document to be forwarded and a filter for applying a restriction to a portion of the document.

The disposition rule described first "dr-retrieve" is applied to the entire PCC of a transmission side (joeblogs) of a forward document, such that a reception side (bob) can see the forwarded entire document.

Through the filter below the first disposition rule, the reception side can eventually see only a name (name), contact information (comm-addr), and a career history (career-history) of the transmission side's PCC.

Likewise, the disposition rule described second "dr-forward" means that the transmission side can forward the forwarded entire document, and through the filter below the second disposition rule, the transmission side can forward only the name and the contact information of the transmission side's PCC.

In step 301, the CAB feature handler app. usage 234 stores the received AB share request message and delivers a response message 200 OK to the transmission-side CAB client 201.

In step 302, the CAB feature handler app. usage 234 notifies the contact share function module 221 in the CAB server 220 of a document change of a CAB feature handler.

In this step, separately from notification of change information by the CAB feature handler app. usage 234, the contact share function module 221 may periodically check if the AB share request message is stored to obtain the change information in the CAB feature handler.

In step 303, the contact share function module 221 in the CAB server 220 delivers a response message 200 OK to the CAB feature handler app. usage 234.

In step 304, in the contact share function module 221, an XDM agent (not shown) creates an XDM Document Command Protocol (XDCP) forward request message, which is an AB forward request message for sharing an AB, and forwards the XDCP forward request message to the CAB XDM server 230.

In step 305, the CAB PCC app. usage 232 adds disposition rule information included in the XDCP forward request message to <disposition-notification-list> in a forward notification list of the LIST XDM server 235. An XML document architecture of <disposition-notification-list> is as described below.

The element <disposition-notification-list> has "request-id" of the XDCP forward request message as its attribute, and has the following sub elements.

1. An element <document-uri> which is an URI of a forward document
2. An element <disposition-rule> for a received document has a sub element <ruleset> which follows a rule of RFC4775.
3. The element <ruleset> has a sub element <rule>.
4. The element <rule> has an "id" for a rule as its attribute, and has sub elements <condition> and <actions>. Herein, "id" is defined as a form which indicates one of the aforementioned 4 disposition rules (for example, "dr-retrieve", "dr-forward", "dr-modify", "dr-modify-right").
5. The element <conditions> has a sub element <identity> to which a disposition rule is to be applied.
6. The element <actions> specifies a disposition rule to be applied.
7. An element <transformations> defines a filter to be applied to a corresponding document and has <filter-set> as a sub element.
8. The element <filter-set> has different meanings with respect to respective disposition rules.
9. <allow-retrieve> defines a portion of a forward XML document which a transmission side allows a reception side to retrieve.

10. <allow-forward> defines a portion of a forward XML document which the transmission side allows the reception side to retrieve and forward.
11. <allow-modify> defines a portion of a forward XML document which the transmission side allows the reception side to retrieve and modify.
12. <allow-modify-right> defines a portion of a forward XML document which the transmission side allows the reception side to perform disposition modification (retrieve/modify/forward) on.

In addition, as a restriction for the disposition rules, a logical error should not occur when the described rules are combined.

Table 2 shows a disposition notification list including disposition rule information.

TABLE 2

```
<disposition-notification-list request-id="abab1212">
<document-uri>http://xcap.example.com/org/openmobilealliance.pcc/users/
sip:joeblogs@example.com/my_pcc
</document-uri>
<sender-identity>"sip:joeblogs@example.com</sender-identity>
<recipients-list>
    <list>
        <entry uri=sip:bob@example.com/>
    </list>
</recipients-list>
<content-type>application/vnd.oma.cab-pcc+xml</content-type>
<disposition-rules>
<cp:ruleset>
 <cp:rule cp:id="dr-retrieve">
   <cp:conditions>
     <cp:identity>
       <cp:one id="sip:bob@example.com"/>
     </cp:identity>
   </cp:conditions>
   <cp:actions>
     <allow-retrieve/>
   </cp:actions>
        <cp:transformations>
    <fi:filter-set>
     <fi:ns-bindings>
      <fi:ns-binding prefix="pcc" urn="urn:oma:xml:cab:pcc"/>
     </fi:ns-bindings>
     <fi:filter id="dr-include">
      <fi:what>
       <fi:include type="xpath">//pcc:pcc/pcc:personal-details/
       pcc:name</fi:include>
       <fi:include type="xpath">//pcc:pcc/pcc:personal-details/
       pcc:comm-addr</fi:include>
       <fi:include type="xpath">//pcc:pcc/pcc:personal-details/
       pcc:career-history</fi:include>
      </fi:what>
     </fi:filter>
    </fi:filter-set>
   </cp:transformations>
<cp:rule cp:id="dr-forward">
   <cp:conditions>
     <cp:identity>
       <cp:one id="sip:bob@example.com"/>
     </cp:identity>
   </cp:conditions>
   <cp:actions>
     <allow-forward/>
   </cp:actions>
        <cp:transformations>
    <fi:filter-set>
     <fi:ns-bindings>
      <fi:ns-binding prefix="pcc" urn="urn:oma:xml:cab:cab-pcc"/>
     </fi:ns-bindings>
     <fi:filter id="dr-include">
      <fi:what>
       <fi:include type="xpath">//pcc:cab-pcc/pcc:name</fi:include>
<fi:include type="xpath">//pcc:pcc/pcc:personal-details/pcc:comm-
addr</fi:include>
      </fi:filter>
```

TABLE 2-continued

```
    </fi:filter-set>
   </cp:transformations>
  </cp:ruleset>
 </disposition-rules>
</disposition-notification-list>
```

In step 306, the LIST XDM server 235 adds disposition rule information to the disposition notification list, and delivers a response message (200 OK) thereto to the CAB PCC app. usage 232.

In step 307, the CAB PCC app. usage 232 recognizes that user information included in the XDCP forward request message indicates a user of another domain, stores AB data to be shared in a temporary storage space, and then delivers the XDCP forward request message to a reception-side network 401.

In step 308, the reception-side network 401 delivers a response message (200 OK) with respect to a forward result to the CAB PCC app. usage 232.

In step 309, the CAB PCC app. usage 232 creates a response message (200 OK) with respect to the XDCP forward request message to the CAB server 220.

In step 310, the contact share function module 221 of the CAB server 220 delivers a forward result to the CAB PCC app. usage 232.

In step 311, the CAB PCC app. usage 232 delivers a response message (200 OK) with respect to a forward result to the contact share function module 221 of the CAB server 220.

FIG. 4 is a flowchart illustrating a process of delivering, at a reception-side CAB system, an XML document request message including disposition rule information received from a transmission-side network to a reception-side CAB client, according to an embodiment of the present invention.

In step 500, the CAB PCC app. usage 232 of the CAB XDM server 230 receives an XDCP forward request message from a transmission-side network 402.

In step 501, the CAB PCC app. usage 232 checks reception-side information in the XDCP forward request message to check if a reception side for receiving a message is in a corresponding domain, and delivers a response message (200 OK) thereto to the CAB PCC app. usage of the transmission-side CAB client 201.

In step 502, the CAB PCC app. usage 232 checks a preference of a reception-side CAB client 202 with respect to the XDCP forward request message from AB forward preference information included in the CAB AB app. usage 231.

Herein, there are three types of an AB forward preference. In an embodiment of the present invention, a description will be made, as an example, of a case where the reception-side CAB client 202 receives an XDM resource received from the transmission-side CAB client 201.

A. Accept—an XDM resource forwarded from a transmission side is automatically stored in a corresponding XDM server.

B. Confirm—the XDM resource forwarded from the transmission side is notified to a reception side and then a determination thereon is waited.

C. Reject—the XDM resource forwarded from the transmission side is rejected without being stored in the corresponding XDM server.

In step 503, the CAB PCC app. usage 232 retrieves the XDM resource from a CAB PCC app. usage in a transmission-side CAB XDM server by using a Uniform Resource Identifier (URI) of a transmission-side CAB client included in the XDCP forward request message, and then stores the XDM resource in the form of a document such as "ContactSharePCC.xml".

In step 504, the CAB server 220 is notified of a document change from the CAB PCC app. usage 232.

In step 505, the CAB server 220 delivers a response message (200 OK) with respect to the document change notification to the CAB PCC app. usage 232.

In step 506, the CAB server 220 converts AB share data into a format which is used in the CAB AB app. usage 231, and adds the converted AB share data to an AB document in the CAB AB app. usage 231.

The CAB server 220 may further include information about a contact status, e.g., a contact type, an update form or a temporary addition form with respect to an entry status, application or non-application of disposition rules, etc., in the AB document.

Table 3 shows an example of a contact status added together with contact share data in the AB document.

TABLE 3

```
<contact-status>
    <contact-type> CAB </contact-type>
    <entry-status>
        <updated>contact-share</updated>
        <disposition-rules>true</disposition-rules>
    </entry-status>
</contact-status>
```

In step 507, the CAB AB app. usage 231 receives a response message (200 OK) from the CAB server 220.

In step 508, the CAB feature handler app. usage 234 adds an element <request-notification-list> in a forward notification list of the LIST XDM server 235 to notify a reception side of details regarding the received XDCP forward request message. At this time, the LIST XDM server 235 also stores disposition rule information applied to a corresponding document.

Table 4 shows an example of the element <request-notification-list> including disposition rules in the forward notification list of the LIST XDM server 235.

TABLE 4

```
<request-notification-list auid="org.openmobilealliance.pcc">
    <request document-
uri="http://xcap.example.com/org/openmobilealliance.pcc/users/
sip:joeblogs@example.com/my_pcc"
>
    <sender-identity>"sip:joeblogs@example.com"</sender-identity>
    <expiration-time>Tue, 29 Sep 2010 16:00:00 GMT </expiration-
    time>
    <status>delivered</status>
    <content-type>application/vnd.oma.cab-pcc+xml</content-type>
    <note> This is my PCC </note>
    <disposition-rule>
    <cp:ruleset>
      <cp:rule cp:id="dr-retrieve">
        <cp:conditions>
         <cp:identity>
            <cp:one id="sip:bob@example.com"/>
         </cp:identity>
        </cp:conditions>
        <cp:actions>
          <allow-retrieve/>
        </cp:actions>
        <cp:transformations>
         <fi:filter-set>
          <fi:ns-bindings>
            <fi:ns-binding prefix="pcc" urn="urn:oma:xml:cab:pcc"/>
```

TABLE 4-continued

```
        </fi:ns-bindings>
        <fi:filter id="dr-include">
          <fi:what>
            <fi:include type="xpath">//pcc:pcc/pcc:personal-details/
            pcc:name</fi:include>
            <fi:include type="xpath">//pcc:pcc/pcc:personal-details/
            pcc:comm-addr</fi:include>
            <fi:include type="xpath">//pcc:pcc/pcc:personal-details/
            pcc:career-history</fi:include>
          </fi:what>
        </fi:filter>
      </fi:filter-set>
    </cp:transformations>
  <cp:ruleset>
    <cp:rule cp:id="dr-forward">
      <cp:conditions>
        <cp:identity>
          <cp:one id="sip:bob@example.com"/>
        </cp:identity>
      </cp:conditions>
      <cp:actions>
        <allow-forward/>
      </cp:actions>
    <cp:transformations>
      <fi:filter-set>
        <fi:ns-bindings>
          <fi:ns-binding prefix="pcc" urn="urn:oma:xml:cab:cab-pcc"/>
        </fi:ns-bindings>
        <fi:filter id="dr-include">
          <fi:what>
            <fi:include type="xpath">//pcc:cab-pcc/pcc:name</
            fi:include>
      <fi:include type="xpath">//pcc:pcc/pcc:personal-details/pcc:comm-
      addr</fi:include>
        </fi:filter>
      </fi:filter-set>
    </cp:transformations>
  </disposition-rule>
  </request>
</request-notification>
```

The LIST XDM server 235 updates and stores the element <request-notification-list> including disposition rules in the forward notification list in step 508, and delivers a response message (200 OK) to the CAB PCC app. usage 232 in step 509.

In step 510, the LIST XDM server 235 may notify the reception-side CAB client 202 of a forward notification list document change for notifying update of a forward notification list document. The reception-side CAB client 202 is assumed to subscribe to the forward notification list document change in advance. Step 510 may be performed after AB synchronization of step 511.

In step 511, the CAB server 220 delivers a server alert message including a document change occurring in the CAB AB app. usage 231 to the reception-side CAB client 220 for AB synchronization of the reception-side CAB client 202.

When the contact share data is an AB rather than a PCC, disposition rules may be applied in the similar manner. However, in case of the PCC, the PCC does not include information about a contact status, such that information update with respect to a contact status in step 506 is not performed.

If the user preference of the reception-side user is not "accept" and is "confirm", then the received AB document is added to the CAB AB app. usage 231 and the entry status of the contact status is set to "temporary" for synchronization with a CAB client address, and the reception side directly indicates an intention to confirm the AB document and removes "temporary", thus completing contact share.

When disposition rules of an XML document to which forwarded disposition rules have been applied are to be modified by a reception side's request or a transmission side's intention, the transmission side forwards an XDCP forward request message including modified disposition rules to the reception side, based on a history of a request message stored in a terminal; the CAB AB app. usage 231 to which the XDCP forward request message is forwarded; a request history information document of an app. usage such as the CAB PCC app. usage 232; or disposition rule related information, such as a reception side, a disposition rule application target document, a content type, a transmission side, applied disposition rules, etc., from <disposition-notification-list> in the forward notification list stored in the LIST XDM server 235, so that disposition rules of an XDML document to which disposition rules forwarded to the reception side have been applied can be modified.

The transmission side obtains information of a previously forwarded XDCP forward request message, such as a request ID, from a history of a request message stored in a terminal; the CAB AB app. usage 231 to which the XDCP forward request message is forwarded; or a request history information document of an app. usage such as the CAB PCC app. usage 232, creates an XDCP forward request message including modified disposition rules based on obtained information, and delivers the created XDCP forward request message to the reception side through the same process as shown in FIGS. 3 and 4, such that disposition rules of the XML document to which the previously forwarded disposition rules have been applied can be modified.

The transmission side modifies disposition rules applied to the reception side among corresponding disposition rules such as a reception side, a disposition rule application target document, a content type, a transmission side, applied disposition rules, etc., from <disposition-notification-list> in the forward notification list stored in the LIST XDM server 235.

The CAB PCC app. usage 232 notified of the modification of the disposition rules creates a new contact share request in the CAB feature handler app. usage 234, newly creates <disposition-notification-list> in the forward notification list regarding the modified disposition rules, and delivers the XDCP forward request message to the reception side as in step 307 of FIG. 3, such that the disposition rules of the XML document to which the previously forwarded disposition rules have been applied can be modified through the same process as steps following step 308 of FIG. 3.

Moreover, when a user of another terminal downloads and stores a preset share document, the corresponding terminal displays information of document disposition rules which are set in the share document, and may request a change of the displayed information of the document disposition rules.

As such, the present invention creates disposition rules and applies them to the entire document or a portion thereof forwarded during XML document forwarding, thereby allowing efficient management and disclosure of private information forwarded to the user and thus easily and quickly providing a CAB server according to user's selection.

While a detailed embodiment of the present invention has been described, various modifications can be carried out without departing from the scope of the present invention. Therefore, the scope of the invention is not defined by the foregoing embodiment of the invention, but should be defined by claims and equivalents thereof.

The invention claimed is:

1. A method for setting disposition of a shared document by a first electronic device, the method comprising:
   selecting one or more disposition rules for a share document to be shared with a second electronic device;
   creating a document share request message including the one or more disposition rules;
   forwarding the created document share request message to a second electronic device through a transmission-side server; and
   if one or more request message for modifying the one or more disposition rules is received from the second electronic device, modifying the one or more disposition rules based on a history of the one or more request messages, wherein the one or more request messages are accumulatively stored in the first electronic device.

2. The method of claim 1, wherein the one or more disposition rules comprise a disposition rule with respect to the entire share document or a disposition rule for at least part of the entire share document.

3. The method of claim 1, further comprising:
   creating a disposition rule modification request message comprising the modified disposition rule; and
   forwarding the disposition rule modification request message to the second electronic device.

4. The method of claim 1, wherein the second electronic device receives a server notification message for synchronization of the share document from a reception-side server.

5. The method of claim 1, wherein the one or more disposition rules comprise allowance information indicating allow-retrieve, allowance information indicating allow-modify, allowance information indicating allow-forward, allowance information indicating allow-modify-right, disallowance information indicating disallow-modify-right, or disallowance information indicating disallow-forward.

6. A first electronic device for setting disposition of a share document, the electronic device comprising:
   a communication interface; and
   a processor configured to:
   select one or more disposition rules of a share document to be shared with a second electronic device;
   create a document share request message including the one or more disposition rules,
   control the communication interface to forward the document share request message to the second electronic device through a transmission-side server, and
   if a request for modifying the one or more disposition rules is received from the second electronic device, modify the one or more disposition rules based on a history of one or more request messages, wherein the one or more request messages are accumulatively stored in the first electronic device.

7. The first electronic device of claim 6, wherein the one or more disposition rules comprise a disposition rule for the entire share document or a disposition rule for at least part of the entire share document.

8. The first electronic device of claim 6, wherein the processor is further configured to:
   if a request for modifying the one or more disposition rules for the share document is received from the second electronic device, modify the one or more disposition rules based on a history of one or more request messages, wherein the one or more request messages are accumulatively stored in the first electronic device,
   create a disposition rule modification request message comprising the modified disposition rule, and
   control the communication interface to forward the disposition rule modification request message to the second electronic device.

9. The first electronic device of claim 6, wherein the second electronic device receives a server notification message for synchronization of the share document from a reception-side server.

10. The first electronic device of the claim 6, wherein the transmission-side server is configured to:
    receive the document share request message comprising the one or more disposition rules from the first electronic device; and
    deliver a response message corresponding to the document share request message to the second electronic device,
    update a disposition rule for a previously stored share document based on the one or more disposition rules,
    create a document forward request message for forwarding the share document to the second electronic device, and
    forward the document forward request message to the second electronic device.

11. The first electronic device of claim 10, wherein the transmission-side server is further configured to:
    if a response message corresponding to the document forward request message is received from the second electronic device, deliverer a response message including a forward result to the first electronic device.

12. The first electronic device of claim 6, wherein the one or more disposition rules comprise allowance information indicating allow-retrieve, allowance information indicating allow-modify, allowance information indicating allow-forward, allowance information indicating allow-modify-right, disallowance information indicating disallow-modify-right, or disallowance information indicating disallow-forward.

13. The first electronic device of claim 10, wherein the transmission-side server is further configured to update a disposition notification list by adding the one or more disposition rules to the disposition notification list.

* * * * *